(12) United States Patent
Abedi

(10) Patent No.: US 9,607,187 B2
(45) Date of Patent: Mar. 28, 2017

(54) SYSTEMS AND METHODS FOR INTERFERENCE MITIGATION IN PASSIVE WIRELESS SENSORS

(71) Applicant: University of Maine System Board of Trustees, Bangor, ME (US)

(72) Inventor: Ali Abedi, Orono, ME (US)

(73) Assignee: UNIVERSITY OF MAINE SYSTEM BOARD OF TRUSTEES, Bangor, ME (US)

(*) Notice: Subject to any disclaimer, the term of this patent is extended or adjusted under 35 U.S.C. 154(b) by 193 days.

(21) Appl. No.: 14/471,633

(22) Filed: Aug. 28, 2014

(65) Prior Publication Data

US 2015/0154432 A1  Jun. 4, 2015

Related U.S. Application Data

(60) Provisional application No. 61/871,511, filed on Aug. 29, 2013.

(51) Int. Cl.
 *G06K 7/10*  (2006.01)
 *G06K 19/07*  (2006.01)

(52) U.S. Cl.
 CPC ..... *G06K 7/10019* (2013.01); *G06K 19/0716* (2013.01); *G06K 19/0723* (2013.01)

(58) Field of Classification Search
 CPC ........... G06K 19/0716; G06K 19/0723; G06K 7/10019
 See application file for complete search history.

(56) References Cited

U.S. PATENT DOCUMENTS

| 6,806,808 | B1 | 10/2004 | Watters et al. | |
|---|---|---|---|---|
| 7,623,037 | B1* | 11/2009 | Malocha | G06K 19/0672 333/193 |
| 8,237,550 | B2 | 8/2012 | Reichert et al. | |
| 8,348,504 | B2 | 1/2013 | Gregory et al. | |
| 2004/0223481 | A1* | 11/2004 | Juels | G06K 7/0008 370/345 |
| 2008/0012710 | A1* | 1/2008 | Sadr | G06K 7/0008 340/572.1 |
| 2010/0117804 | A1* | 5/2010 | Malocha | G06K 19/0675 340/10.2 |
| 2011/0135026 | A1* | 6/2011 | Malocha | G06K 19/0672 375/267 |
| 2013/0038468 | A1* | 2/2013 | Wang | H02J 3/14 340/870.02 |

(Continued)

OTHER PUBLICATIONS

Abedi, A. and Zyck, K., Interactive Interference Management in Coded Passive Wireless Sensors, IEEE Sensors 2013 Conference, 4 pages (2013).

(Continued)

*Primary Examiner* — Sisay Yacob
(74) *Attorney, Agent, or Firm* — Choate, Hall & Stewart LLP; William R. Haulbrook

(57) ABSTRACT

Systems and methods are disclosed that reduce or eliminate interference from non-target sensors in a wireless network. In some embodiments, the sensors contain a blocking device, such as a diode or a transistor, connected between the antenna and the transducer that blocks the cross-correlation response from being transmitted from non-target sensors while permitting an autocorrelation response from a target sensor to be transmitted.

36 Claims, 5 Drawing Sheets

(56) References Cited

U.S. PATENT DOCUMENTS

2013/0181573 A1* 7/2013 Hines .................. H04L 25/02
310/313 R

OTHER PUBLICATIONS

Abedi, A., Signal Detection in passive wireless sensor networks based on back-propagation neural networks, IET Wirel. Sens. Syst., 1(1):48-54 (2011).

Abedi, A., Wireless Sensors without Batteries, High Frequency Electronics, 22-26 (2012).

Dudzik, E. et al., Wireless multiple access surface acoustic wave coded sensor system, Electronic Letters 44(12):2 pages (2008).

Gallagher, D. R. et al., Ultra-Wideband Communication System Prototype Using Orthogonal Frequency Coded SAW Correlators, IEEE Transactions on Ultrasonics, Ferroelectrics, and Frequency Control, 60(3):630-636 (2013).

Hines, A. T. et al., Techniques for Optimal DSSS Code Selection for SAW Multi-Sensor Systems, IEEE International Frequency Control Symposium, 4 pages (2012).

* cited by examiner

SYSTEMS AND METHODS FOR INTERFERENCE MITIGATION IN PASSIVE WIRELESS SENSORS

BACKGROUND

Wireless sensors are highly desirable for many modern technological applications. These sensors have significant potential for use in a variety of fields, including environmental monitoring, health monitoring, monitoring of smart homes and businesses, monitoring of oil and gas exploration and pipelines, and monitoring in aerospace applications. Wireless sensors may be used for simple identification, measurement of environmental parameters, such as temperature or humidity, or provide information on parameters associated with more complex chemical and biological systems. According to a report published in October 2012 in IDTechEx, it is predicted that market value for wireless sensor network will exceeds $2 billion by the year 2022. [see F. Gonzalez and P. Harrop, IDTechEx, Batteries & Supercapacitors in Consumer Electronics 2013-2023: Forecasts, Opportunities, Innovation (October 2012)]

For many of these applications, wireless sensors and sensor networks afford the only access to critical information otherwise constrained by physical and/or environmental factors. Ironically, the fact that wireless sensors enable information gathering from difficult to access environments, for example, on moving objects, in secure areas, and in harsh environments, also makes it difficult to provide the sustainable power required for the use of active sensors. In fact, power consumption requirements for active wireless sensors is a limiting factor preventing the more widespread adoption of active sensors in certain wireless sensing applications. Consequently, passive wireless sensors, which operate without a battery or need for other external power source, enable a myriad of embedded sensor applications, and afford the only reasonable access to information from harsh and/or difficult to reach environments that might otherwise be constrained by physical and/or environmental factors. Unfortunately, passive sensors, by virtue of their design, are prone to significant interference being generated by non-target sensors. While several methods have been developed to partially mitigate this interference, none have achieved a satisfactory level of mitigation to allow for large networks of wireless passive sensors.

SUMMARY

The present invention provides, among other things, systems and methods for interference mitigation in passive wireless sensors. The present invention is based, in part, on the surprising discovery that the interference with interrogation of a target sensor caused by cross-correlation responses of non-target sensors could be significantly reduced or, in some embodiments, even eliminated at the sensor through the introduction of a blocking device (e.g., a diode or transistor), thereby allowing for a much larger number of sensors that may be used with a given transceiver.

In some embodiments, the systems of the present invention provides sensors for use in an interrogation system with reduced or eliminated interference from non-target sensors, including an antenna configured to receive an interrogating signal and transmit a response signal detectable by a transceiver; a transducer with an embedded code, wherein the embedded code allows for generation of a sensor response signal to a given interrogating signal wherein the sensor response signal is an autocorrelation response if the sensor is a target sensor and the sensor response signal is a cross-correlation response if the sensor if a non-target sensor; and a blocking device positioned between the antenna and the transducer, wherein the blocking device allows the interrogating signal to be received by the transducer; and where the sensor is a target sensor, allows an autocorrelation response to the interrogating signal to be transmitted via the antenna of a sensor; and where the sensor is a non-target sensor, blocks transmission of a cross-correlation response to the interrogating signal via the antenna.

According to various embodiments, the systems of the present invention provide sets of sensors for use in an interrogation system with reduced or eliminated interference from non-target sensors, each of the set of sensors may include an antenna configured to receive an interrogating signal and transmit a response signal detectable by a wireless reader; a transducer with an embedded code; and a blocking device positioned between the antenna and the transducer, wherein the plurality of sensors, collectively, comprise digital codes embedded in the transducers, the embedded codes allowing for separation of the sensor response signals to a given interrogating signal by creation of an autocorrelation response at a target sensor that is differentiable from cross-correlation responses from non-target sensors, and wherein the blocking device of a given sensor in the set of sensors allows the interrogating signal to be received by the transducer of the given sensor; and where a sensor is a target sensor, allows an autocorrelation response to the interrogating signal to be transmitted via the antenna of the given sensor; and where a sensor is a non-target sensor, blocks transmission of a cross-correlation response to the interrogating signal via the antenna of the given sensor.

In various embodiments, the present invention provides methods of reducing or eliminating interference from non-target sensors in a wireless sensor network, the methods including, receiving an interrogating signal at an antenna of a sensor; comparing a code in the interrogating signal with a code embedded on the sensor; determining if the sensor is a target sensor or a non-target sensor, wherein if the code in the signal matches the code on the sensor, the sensor is a target sensor, and wherein if the code in the signal does not match the code on the sensor, the sensor is a non-target sensor; generating an autocorrelation response if the sensor is the target sensor or generating a cross-correlation response if the sensor is the non-target sensor; allowing the autocorrelation response to be transmitted to the antenna; blocking the cross-correlation response from being transmitted to the antenna; and transmitting the autocorrelation response signal from the antenna.

According to some embodiments, one or more of the sensors comprise a metal electrode photolithographically printed onto a piezoelectric substrate. In some embodiments, at least one sensor may be a passive sensor and/or a surface acoustic wave sensor.

In various embodiments, the set of sensors includes at least 10, at least 20, at least 30, at least 50, at least 100, at least 200, at least 300, at least 400, or at least 500 sensors.

In some embodiments the interrogating signal may be a wideband signal, a narrowband signal, an omnidirectional signal, and/or a directional signal. In some embodiments, the interrogating signal may be radio frequency signals, or acoustic signals.

In some embodiments, the systems and methods of the present invention as described herein provide a sensor or set of sensors for use in an interrogation system with reduced or eliminated interference from non-target sensors, wherein the response to the interrogating signal may be an electrical or acoustic signal.

In some embodiments, the systems and methods of the present invention as described herein provide a sensor or set of sensors for use in an interrogation system with reduced or eliminated interference from non-target sensors, wherein the embedded code is a quasi-orthogonal digital code.

According to various embodiments, the blocking device positioned between the antenna and the transducer has an embedded threshold based at least in part on a ratio of peak to side lobe ratio (PSLR) of the autocorrelation response of the code for the sensor and maximum peak of the cross-correlation of the code for the sensor with the code of another sensor in the set, wherein an autocorrelation response exceeds the threshold and is allowed by the blocking device to pass via the antenna, while a cross-correlation response is below the threshold and is blocked.

In some embodiments, the blocking device may be a hard or soft limiter than can be implemented using a transistor, a metal-oxide-semiconductor field-effect transistor, a bipolar junction transistor, or a diode. The blocking device can be jointly designed with sensor or added later to existing designs.

In various embodiments, the systems and methods of the present invention include a wireless transceiver, wherein the transceiver is configured to transmit an interrogating signal to at least one sensor and is further configured to receive an autocorrelation response from the target sensor. In some embodiments, the transceiver is stationary. In some embodiments, the transceiver is mobile.

In some embodiments, the transceiver may be configured to simultaneously transmit a plurality of different coded interrogating messages, wherein each of the plurality of coded interrogating messages may be targeted to a different sensor, and wherein the transceiver may be further configured to simultaneously receive and process responses from the plurality of sensors. In some embodiments, the sensors are coded while in some other embodiments the sensors impulse response is measured without any coding.

BRIEF DESCRIPTION OF THE FIGURES

The foregoing and other objects, aspects, features, and advantages of the present disclosure will become more apparent and better understood by referring to the following description taken in conjunction with the accompanying figures, in which.

Figure 1:
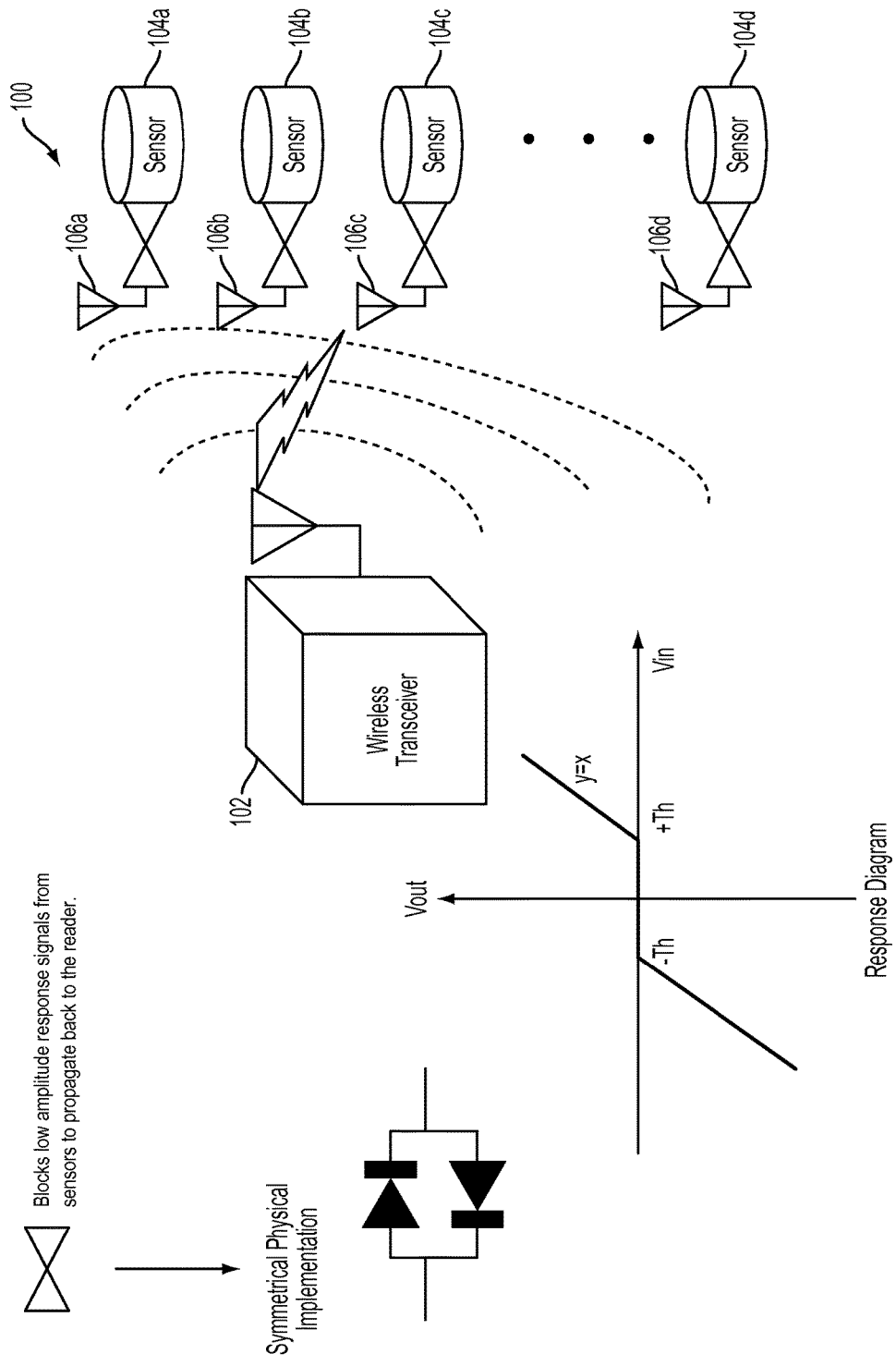
FIG. 1 shows a system level diagram of a wireless transceiver in communication with passive sensors in accordance with various embodiments. Th is the threshold that needs to be designated for different sensor and tag types based on peak to side lobe ratio of autocorrelation and max peak of cross correlation. Th is then used to determine diode type for physical implementation. Note, though the response diagram is shown as symmetrical, this is for the purpose of example only and it need not be symmetrical.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF CERTAIN EMBODIMENTS

The present invention provides, among other things, systems and methods for interference mitigation in passive wireless sensors. The present invention is based, in part, on the surprising discovery that the cross-correlation responses of non-target sensors could be significantly reduced or, in some embodiments, even eliminated at the sensor through the introduction of a blocking device (e.g., hard or soft limiter implemented using a diode or a transistor), thereby allowing for a much larger number of sensors that may be used with a given transceiver. The addition of a blocking device provides a low cost, low complexity method for significantly enhancing the effectiveness and utility of passive wireless networks. In contrast to earlier systems that rely on minimizing responses to the interrogating signal from non-target sensors through modification and/or interference mitigation at the transceiver level, the present invention surprisingly may partially or completely mitigate the response of non-target sensors at the sensor level. In some embodiments only a single response to the interrogating signal arrives back at the transceiver, thus, interference from responses of non-target sensors at the transceiver are reduced or eliminated.

Passive Sensors in General

Passive sensors can be designed to measure physical parameters such as temperature, humidity, pressure, and strain and send those values back to a transceiver, along with an identification of the sensor itself One example of a passive sensor network is a radio frequency sensor network which consists of a Radio Frequency Identification (RFID) transceiver in communication with a network of passive RFID wireless sensors. With no onboard power source, RFID sensors are driven by energy the radio frequency (RF) signals emitted from the RFID reader. When interrogated by an RF signal, an RF sensor is powered resulting triggering a response. Of course, a single omnidirectional RF interrogating signal will ping every RF sensor within range. A response signal is produced at each sensor, both target and non-target sensors and transmitted by an antenna back to and inundating the RFID transceiver.

A response from the target sensor is mixed with an orthogonal response generated by each non-target sensor. While the orthogonal response is weaker, its presence at the transceiver makes it difficult to distinguish the response of the target RFID sensor from the interference generated by the non-target sensors. As the number of RF sensors increases in the RF network, the amount of interference is compounded. As a result, it becomes increasingly difficult in larger networks to identify the response of the target RFID sensor. Without a means to reduce this interference, such an RF sensor network is limited to only a small numbers of sensors.

There are three ways to separate the responses and manage the interference caused by the responses of non-target sensors. These techniques are: time domain, frequency domain, and code domain. Time domain and frequency domain techniques, in particular, have limited capabilities. The time domain method is constrained by the need for synchronization and the limit on read rate for time domain systems. Frequency domain methods are mainly limited by a scarcity of spectrum. These challenges restrict the use of these methods for a large number of sensors.

The third method, code domain, uses orthogonal coding schemes and has the potential to provide discrete interrogation of numerous sensors within the vicinity of each other and a wireless transceiver. In analog systems quasi-orthogonal codes will replace digital orthogonal codes. Frequency coding and time delay coding are also other means of creating coded sensors. While coding alone may reduce the interference caused by responses from non-target sensors, such techniques have proven insufficient to eliminate interference for large numbers of sensors and/or under variable environmental conditions. In order to support widespread and effective deployment of wireless sensor networks, the interference should be significantly reduced, and/or eliminated. Previous sensors and sensor networks use one or more computation heavy interference reduction algorithms at the wireless transceiver, which require computation by the transceiver, resulting in significant power and/or processing requirements, each of which ultimately increases the cost and limits the utility of such sensor networks. These and other limitations have severely hindered the deployment of such networks in certain fields.

Improved Interference Mitigation

In some embodiments, the present invention provides sensors for use in an interrogation system with reduced or eliminated interference from non-target sensors, including an antenna configured to receive an interrogating signal and transmit a response signal detectable by a wireless reader; a transducer with an embedded code, wherein the embedded code allows for generation of a sensor response signal to a given interrogating signal wherein the sensor response signal is an autocorrelation response if the sensor is a target sensor and the sensor response signal is a cross-correlation response if the sensor if a non-target sensor; and a blocking device positioned between the antenna and the transducer, wherein the blocking device allows the interrogating signal to be received by the transducer; and where the sensor is a target sensor, allows an autocorrelation response to the interrogating signal to be transmitted via the antenna of the given sensor; and where the sensor is a non-target sensor, blocks transmission of a cross-correlation response to the interrogating signal via the antenna.

Antennae

Any of a variety of antennae may be used in various embodiments. Non-limiting exemplary antennae include wire antennae, travelling wave antennae, log-periodic antennae, microstrip antennae, reflector antennae, aperture antennae, or other antennae, such as near field communication (NFC) antennae. Depending on the frequency of operation, required range, and physical characteristics of the environment, an appropriate antenna may be selected. The proposed interference mitigation method in this invention is antenna agnostic.

The antenna can be an electrical device which receives and/or transmits electromagnetic waves. In some embodiments the antenna may transmit in all directions (i.e. is omnidirectional). In some embodiments, the antenna may be a directional or beam antennas which transmit or receive from a particular direction. Consequently, the interrogating signal and/or the response signal may transmit to and from the sensor through a directional beam or via omnidirectional transmission. Further, according to numerous embodiments, the antenna of the wireless transceiver may be configured to transmit an interrogating signal and receive a response signal. Additionally, in some embodiments, the antenna at the sensor is configured to both receive the interrogating signal from the wireless transceiver and transmit the response signal back to the transceiver.

Interrogating and Response Signals

The sensors, systems, and methods of the present invention are contemplated to be compatible with any passive sensor network, such as a wireless passive sensor network. Accordingly, a variety of interrogating signals are contemplated as within the scope of the present invention and the exemplary interrogating signals described herein are not intended to be limiting. In each case, a transceiver will transmit an interrogating signal to one or more sensors, which will be processed or otherwise acted upon by the sensor(s) as described. Exemplary interrogating signals include, but are not limited to, electrical signals including digital or analog signals. Specific exemplary signals that may be used as interrogating signals include radio frequency signals, and/or acoustic signals. In some embodiments, an interrogating signal is a wideband signal.

In some embodiments, an interrogating signal may be an omnidirectional signal. In some embodiments, an interrogating signal may be a point-to-point signal (e.g., a fiber optic signal).

In some embodiments, the interrogating signal, for example, an RF signal, may be contain a coded sequence matching that of the target sensor. In some embodiments, the embedded code of the interrogating signal conforms to orthogonal coding design, wherein the code embedded on the interrogating signal may be orthogonal to the code embedded on other non-target sensors within the wireless network. An objective of orthogonal code design is to add multiple access features to passive sensors. According to various embodiments, quasi-orthogonal digital codes embedded within the sensors allow for separation of the sensor responses corresponding to the interrogating signals.

The interrogating signals codes may be directed to autocorrelation and cross-correlation characteristics. Differences between autocorrelation and cross-correlation characteristics allow for discrimination similar to a typical signal to noise ratio (SNR) parameter. However, in orthogonal coding, peak to side lobe ratio (PSLR) is defined to measure the performance of interference mitigation method. While not wishing to be held to a particular theory, it is believed that the main reason behind this distinction is the difference in nature of noise (random) and interference (deterministic).

In some embodiments, the criteria exploited from these differences and for selecting the most appropriate codes for this application use a comparison of the largest peak to side lobe ratio of the autocorrelation response or to the smallest maximum peak value of cross-correlation of that code with any other code in the set. Depending on the threshold level selected for the two criteria, one could generate larger or smaller final subsets of codes.

In some embodiments, a response from a target sensor under interrogation consists or comprises of a peak in an autocorrelation response that is several times larger in amplitude when compared with the largest peak in a cross-correlation response of non-target sensors. This characteristic may be used, according to various embodiments, to mitigate a previously unresolved problem in the art, specifically, how to prevent the inundation of a transceiver with noise from the responses of non-target sensors, which effectively mask the autocorrelation signal of the target sensor.

Transducers

As used herein, the term "transducer" refers to a device that converts energy from one form or type to another. Any of a variety of transducers are contemplated as within the scope of the present invention including, but not limited to contact transducers such as dual element transducers, delay line transducers, angle beam transducers, normal incidence shear wave transducers, and paint brush transducers. In some embodiments, a transducer may be an immersion transducer. In some embodiments, a transducer will convert mechanical energy to electrical energy and/or electrical energy into mechanical energy.

In some embodiments, a transducer for converting the interrogating signal is configured with an embedded code, specific to that particular sensor. In some embodiments, the embedded code on the transducer is formed by depositing micron-sized metallic "fingers," metal electrodes, on a substrate using direct writing or photolithography. According to some embodiments, the substrate is a piezoelectric crystalline substrate. During operation, the interrogating signal impinges on the metallic interdigitated "fingers." The interrogating signal may be transduced to acoustic waves, which travels on the surface of the substrate crystal. These metallic fingers are designed in such a way that they can independently add a phase shift to each smaller portion of received RF signal. In some embodiments, the metallic phase shifting portion of the sensor is designed in such a way that each sensor response is orthogonal to all other sensor responses. In some embodiments, the sequence of phase shifters has high autocorrelation and low cross-correlation with other codes. These phase-shifted smaller portions travel with different velocities in the substrate. Physical changes in the environments changes these velocities and phase shifts making a distorted signal. These codes, if designed properly, allow for usage of multiple sensors within a reasonable distance from each other covering a specific area. In some embodiments, the distinguishing factor between the target sensor response and the plurality of sensors is based on the digital orthogonal codes embedded in their design. As a specific exemplary embodiment, sensors are designed on a lithium niobate substrate with metal interdigitated fingers deposited on the surface to implement the codes with operation at 107 MHz within FM radio band, one of the most polluted spectrums. Other embodiments include embedding codes in form of different frequency resonators or various time delays. Exemplary embodiments, including exemplary coding schemes, that are contemplated as within the scope of the present invention include those described in A. T. Hines, D. Y. G. Tucker, J. H. Hines, J. Castro, A. Abedi, "Techniques for Optimal DSSS Code Selection for SAW Multi-Sensor Systems," IEEE International Frequency Control Symposium, Baltimore, Md., May 2012; and Gallagher, D. R.; Kozlovski, N. Y.; Malocha, D. C., "Ultra-wideband communication system prototype using orthogonal frequency coded SAW correlators," *Ultrasonics, Ferroelectrics and Frequency Control, IEEE Transactions on*, vol. 60, no. 3, pp., March 2013, the disclosures of which are hereby incorporated by reference in their entirety.

Blocking Devices

According to various embodiments, any of a variety of blocking devices are contemplated as within the scope of the invention. In some embodiments, a blocking device may be a transistor. In some embodiments, a transistor may be as a field effect transistor (i.e., a metal-oxide semiconductor field-effect transistor (MOSFET)), a bipolar junction transistor, or junctionless nanowire transistor, among others. In some embodiments, a blocking device may be a diode.

Regardless of the specific type of blocking device present in a particular embodiment, the blocking device will comprise certain attributes. First, the blocking device will allow for a signal to be received by the antenna and transmitted to the transducer. Second, the blocking device will allow for transmission of a response signal to the antenna and thus to the transceiver, only if the response signal indicates the sensor is a target sensor, for example, if the response signal has an amplitude that is higher than a predefined threshold amplitude. Third, the blocking device will prevent transmission of a response signal to the antenna if the response signal indicates the sensor is a non-target sensor.

In some embodiments, a blocking device is positioned between the antenna and the transducer. According to several embodiments, the blocking device may serve to separate an autocorrelation response from a cross-correlation response. For example, if the sensor being assessed is a target sensor, then the blocking device determines the encoded interrogating signal to be an autocorrelation response and transmits the autocorrelation response via an antenna of the given target sensor to the wireless transceiver. Alternatively, if the sensor being assessed is a non-target sensor, then the blocking device determines the encoded interrogating signal to be a cross-correlation response and the blocking device prevents this signal from being transmitted by the antenna of the sensor. Therefore, in some embodiments, the sensor has the capability to differentiate a target sensor from a non-target sensor based on the character for response the sensor generates and transmit only the desired autocorrelation response.

Exemplary Operational Considerations

According to some embodiments, the sensor or sensors can be part of a larger wireless network. This network may include a wireless transceiver configured to transmit an interrogating signal, for example, an RF signal. Various bands of spectrum may be used for passive wireless sensor applications. These bands include, but are not limited to, VHF Band (30-300 MHz), UHF (300-3000 MHz), and SHF (3-30 GHz). Some embodiment may include Tera HZ band as well for short range applications such as skin cancer sensor or seeing through the wall security sensors. Further discussion of usable spectrum as well as other considerations in accordance with various embodiments may be found in A. Ghassemi, A. Abedi, F. Ghassemi, *Propagation Engineering in Radio Link Design,* 553 pages, Springer, Jan 2013, ISBN: 978-1-4614-5313-0; and A. Ghassemi, A. Abedi, F. Ghassemi, *Propagation Engineering in Wireless Communications,* 434 pages, Springer, August 2011, ISBN: 978-1-4614-1076-8, the disclosures of which are hereby incorporated in their entirety.

Typically, each sensor is unique with regard to at least its physical location and embedded code. In some embodiments, the interrogating signal can be coded to query a response from a single sensor. However, in some embodiments, a transceiver may transmit an omnidirectional wideband interrogating signal, that results in transmission to all sensors within the transmission range of the transceiver. As used herein, a wideband signal is defined to have bandwidth of at least 25% of its central frequency. For instance, the 107 MHz sensors can be interrogated with a signal with bandwidth of 26.75 MHz.

In numerous embodiments, interrogating a sensor within a network of wireless sensors may occur according to the following exemplary description. A wireless transceiver transmits a coded interrogating signal. The transmission is omnidirectional having sufficient range to solicit a response from the target sensor. The target sensor has an embedded code matching the code of the interrogating signal. In addition to the target sensor, a plurality of other sensors exist within range of the wireless transceiver receive the interrogating signal. These other sensors within the range of the wireless transceiver are the non-target sensors. The embedded code of the non-target sensors is not configured match the code of the interrogating signal. The interrogating signal propagates until received by the target sensor. The transducer in the target sensor converts the interrogating signal to a response signal. The resultant response signal is representative of the target sensor comprising the desired data/information configured with high amplitude autocorrelation peaks. The blocking device detects and transmits the autocorrelation response to the transceiver. Alternatively, in some embodiments, if the interrogating signal is orthogonal to the interrogating signal that matches the target sensor, then the sensor will generate cross-correlation peaks. The blocking device blocks is configured to prevent any response signal containing cross-correlation peaks from being transmitted from the sensor, thus not reaching the transceiver.

The power requirements for passive (i.e. battery free) wireless sensors are generally application dependent. Applications having more advanced functionality will usually have greater power requirements. For example, a simple identification reading requires minimal power whereas more complex function, particularly requiring data display require more. As discussed above, these sensors are often exposed to remote or harsh environments, and, therefore, it should be expected that these variables will have an impact on the power requirements for the interrogating signal. One of skill in the art will understand the power requirements of a particular embodiment.

According to some embodiments, the invention contemplates spatio-temporal data collection with high resolution and low signal to noise from passive wireless sensors. Within these embodiments, the sensors are coded such that their response is orthogonal or quasi-orthogonal to all other sensors in the sensor network. These sensors can be assessed or queried by an interrogating signal encoded to excite a specific sensor, the target sensor. The interrogating signal may be received by the target sensor, causing the sensor to generate an autocorrelation peak. In contrast, when the interrogating signal encoded to excite a particular target sensor is received by another sensor, a non-target sensor, this non-target sensor may generate a cross-correlation response. In comparison, the autocorrelation response generated by the target sensor is typically much larger in amplitude than the cross-correlation response generated by the non-target sensors within the wireless network. This sensor interrogation process is known as time reversal. Other interrogating methods such as impulse method may also be used for passive sensors interrogation, this disclosure and example will address the time reversal method.

As a result of the above, a surprisingly large number of sensors may be interrogated in a multiple access wireless sensor network with no need for centralized interference management methods at the transceiver. The advantage of this approach is significant. All other interference management methods reduce interference to some extent, but this approach, in some embodiments, may completely eliminate interference.

In some embodiments, provided sensor networks may comprise a plurality of sensors. In some embodiments, the plurality of sensors comprises at least 10 sensors (e.g., 15, 20, 25, 30, 35, 40, 45, 50, 55, 60, 65, 70, 75, 80, 85, 90, 95 or more). In other embodiments, the plurality of sensors comprises at least 20 sensors. In still other embodiments, the plurality of sensors comprises at least 50 sensors. In other embodiments, the plurality of sensors comprises at least 100 sensors, at least 200 sensors (e.g., 300, 350, 400, 450), or at least 500 sensors (e.g., 600, 650, 700, 750, 800, 850, 900, 950, 1,000, or more). In some embodiments, the plurality of sensors is greater than 500 sensors. In some embodiments, the plurality of sensors is less than 10.

According to several embodiments, the interrogating signal is transmitted by a wireless transceiver, a wireless reader, or a wireless transmitter-receiver. One example includes an FPGA based software defined radio with wide band RF front end to eliminate the need for mixers and allow adapting the radio to the channel. In some embodiments, the wireless transceiver is RF; however, one of skill in the art could readily adapt these teachings to other frequency domains within the electromagnetic spectrum. In some embodiments the wireless transceiver is adapted to transmit and receive. In others, the transceiver is configured to transmit only or receive only.

EXAMPLES

Example 1

Exemplary Wireless Sensor Network Configuration

FIG. 1 is an exemplary system level diagram of a wireless transceiver, for example, an RFID reader, in communication with several passive sensors. System 100 includes a wireless transceiver 102 in communication with wireless passive sensors 104a, 104b, 104c, and 104d. Although the implementation pictured in FIG. 1 shows four RF sensor devices 104a, 104b, 104c, and 104d, any number of sensor devices may be included in system 100 in other implementations. In some embodiments, passive sensors 104 may be any of a variety of sensors (e.g., chemical sensors, pressure sensors, temperature sensors, optical sensors, motion sensors, magnetic field sensors, gravity sensors, humidity sensors, moisture sensors, vibration sensors, electrical field sensors, sound sensors, biological sensors, etc.).

According to some implementations, a sensor 104 receives an interrogating signal from the wireless transceiver using its antenna and responds to the signal with data from the sensor or with information stored in its memory. The sensor may also include its own identification information in the response message back to the wireless transceiver. The passive sensors 104 are configured to wirelessly communicate with the transceiver through free space via electromagnetic radiation of a frequency in the radio frequency range (approximately 30 MHz to 300 GHz).

According to some implementations, the wireless transceiver 102 generates interrogating messages targeted for each particular sensor using orthogonal code design. In some embodiments, each interrogating signal is designed such that it will match the embedded code on the transducer of a target sensor and that it will be orthogonal to all other interrogating signals transmitted by transceiver 102. As described above, such orthogonal code design allows for only the target sensor to generate a high amplitude response and the other sensors in network 100 to generate low amplitude unmatched responses. The term orthogonal is not intended to be limited to exactly orthogonal, rather, the term is intended to include high amplitude matched responses and low amplitude unmatched responses that are quasi-orthogonal to each other. Examples of orthogonal coding include Walsh code and pseudo noise (PN) code, among others.

In some embodiments, the transceiver 102 is configured to generate and wirelessly transmit a plurality of different coded interrogating signals, each coded for a particular target sensor 104. Subsequently, in some implementations, the transceiver may receive, read, and process a response signal from each of the multiple different target sensors 104.

According to some implementations, the transceiver 102 may be a stationary transceiver (e.g., industrial RFID transceiver and desktop RFID transceiver) or may be a mobile transceiver (e.g., a handheld RFID transceiver and vehicle mounted transceiver).

Example 2

Exemplary Interference Patterns of Previous Devices

Figure 2A:
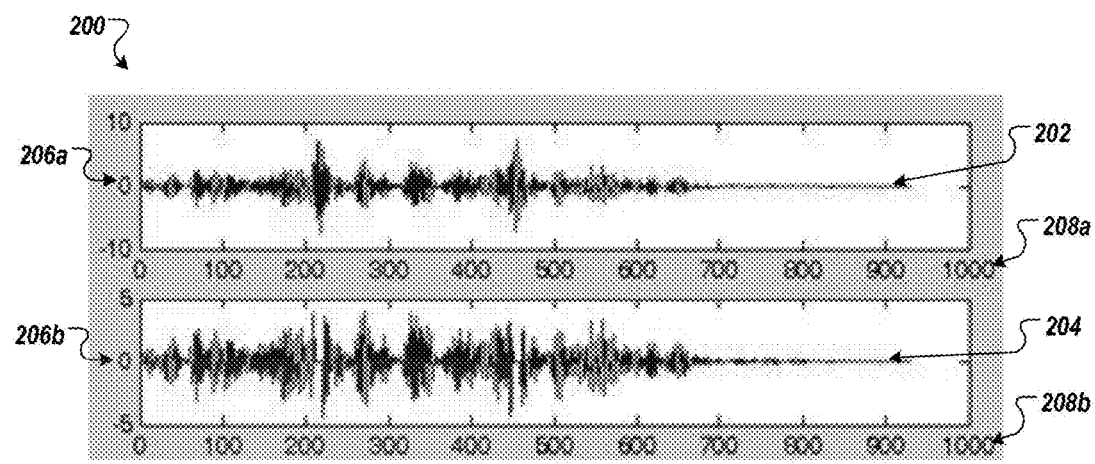
FIG. 2A shows exemplary plots illustrating the response received at an RF transceiver from a target sensor and non-target sensors when a blocking device is not used.

FIG. 2A shows exemplary plots 200 illustrating the interference received at an RFID transceiver, such as RF transceiver 102 of FIG. 1, from one (206a) and five (206b) unmatched interfering sensors that do not possess a blocking device. Plot 202 shows the interference received at the RFID transceiver from one interfering sensor without a blocking device. Plot 204 shows the interference received at the RFID transceiver from five interfering sensors, each without a blocking device. Plots 202 and 204 show signal magnitude (y-axis 206a and 206b, respectively) against time (x-axis 208a and 208b, respectively). Plot 204 shows that the combined response from five sensors creates higher amplitude interference signals than just one interfering sensor plot 202 when the RF sensors do not contain any blocking device. Interference from multiple sensors additively cumulates until a high amplitude noisy signal is received at the RF transceiver. Such amplitude noise makes it difficult to detect the response message from the target RF sensor.

Figure 2B:
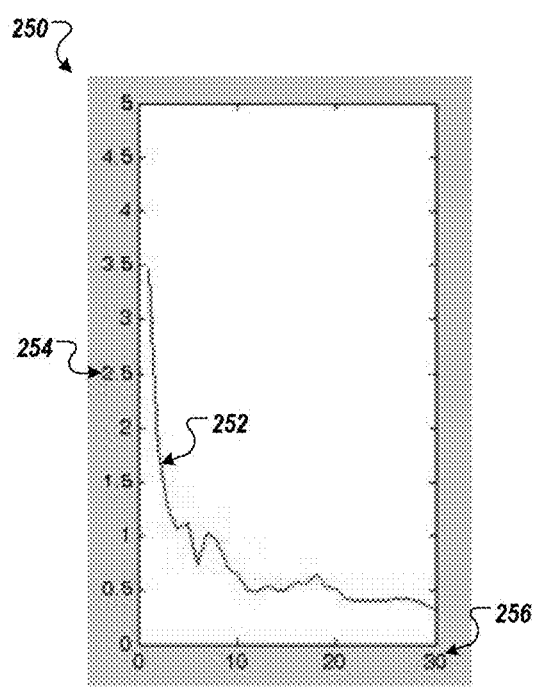
FIG. 2B shows an exemplary plot of the response from a target RF sensor within a large sensor network when a blocking device is not used.

FIG. 2B shows a plot 250 illustrating the challenges in identifying the response from a target RFID sensor in a large sensor network of RF sensors, where each RF sensor does not include any blocking device to remove interference. Plot 250 demonstrates the ratio 252 of response signal amplitude from the target sensor to the response signal amplitude of interfering sensors. Plot 250 plots the ratio on y-axis 254 against the number of RF sensors in the network on the x-axis 256. Plot 250 shows that as the number of RF sensors increases in a sensor network, it is increasingly more difficult to distinguish the target sensor response from the response of interfering sensors. The signal detection problems shown in FIG. 2A and FIG. 2B are reduced or eliminated by the sensors of the present invention, for example, the sensor shown in FIG. 3.

Example 3

Exemplary Interference Mitigating RFID Sensor

Figure 3:
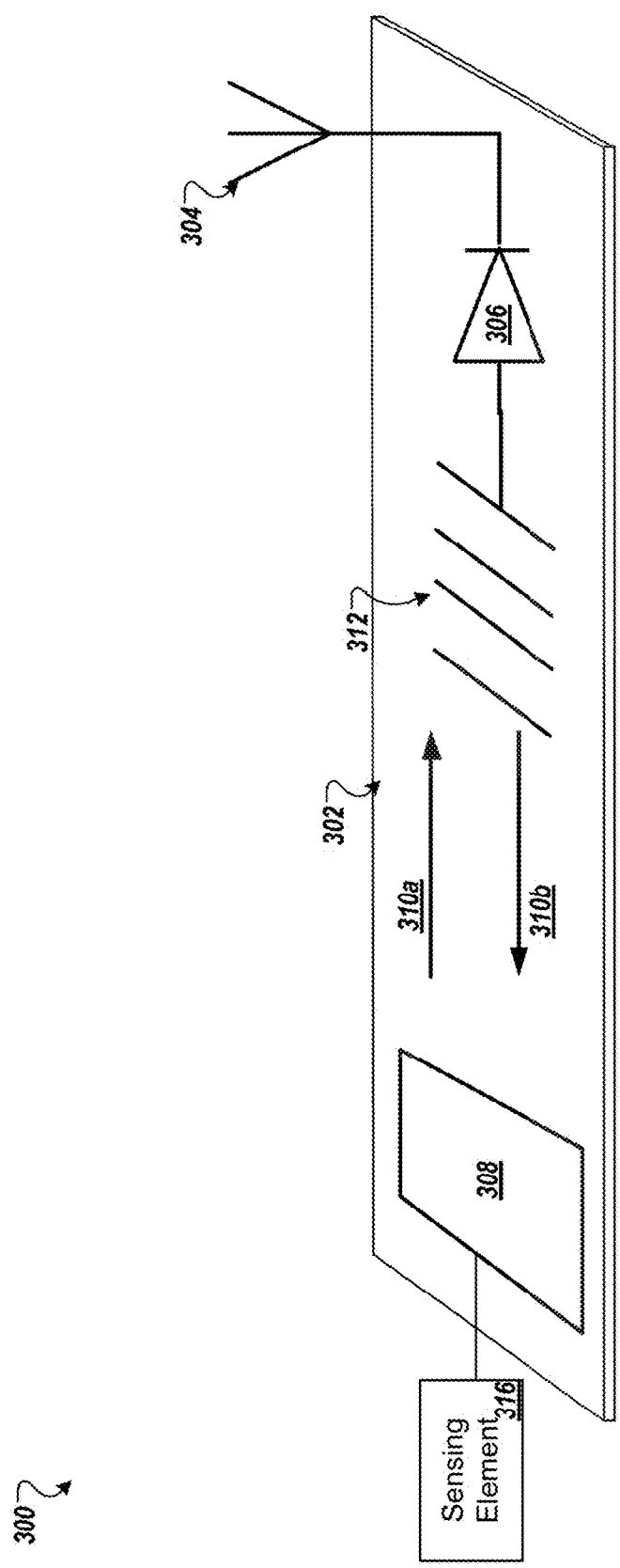
FIG. 3 depicts a schematic view of a sensor in accordance with several embodiments of the disclosure, which includes a transducer, blocking device, and antenna.

FIG. 3 is a schematic view of an exemplary RFID sensor device 300. According to the implementation pictured in FIG. 3, the RFID sensor is a surface acoustic wave (SAW) sensor laid out on a substrate 302. The RF sensor device 300 includes an antenna 304, a blocking device 306, processing circuitry 308, phase shifted reflectors 312, and sensing element 316. Antenna 304 receives interrogating messages from an RF transceiver, such as RF transceiver 102 of FIG. 1, and transmits response messages to the RF transceiver. The sensing element 316 measures one or more physical parameters from its environment and passes along the data as part of the response message to the RF transceiver through antenna 304. Once antenna 304 receives the interrogating signal 304, the RFID sensor device 300 is powered from the signal power of the received interrogating signal. The interrogating signal is passed through the unidirectional blocking device 306, which allows interrogating signals to be passed along to the phase shifted reflectors 312. The phase shifted reflectors (which may be metallic electrodes) 312 deposited on a piezoelectric substrate 302 receive the interrogating signal. Upon striking the reflectors 312, the interrogating signal is transduced to acoustic waves, which travels on the surface of the substrate 302. The metallic reflectors 312 are designed to independently add a phase shift to each smaller portion of a received RF signal. These phase-shifted smaller portions travel with different velocities across substrate 302. Physical changes in the environment of the sensor 302, often influenced by the environment that the sensor is intended to measure, change these velocities. The resulting phase shifts create a distorted signal that is reflected back to the RF transceiver, through antenna 304, as a response message.

In some embodiments, a sensing element 316 working in tandem with processing circuitry 308 may modify the surface acoustic waves travelling on the surface of substrate 302 and create phase shifts in the surface acoustic waves, thereby generating a response message 310a. In some embodiments, there may be at least two sets of reflectors 312 on sensor device 300. One set of input reflectors may convert the received interrogating signal from an RF signal to a mechanical surface acoustic wave and another set of output reflectors may convert the surface acoustic wave response message back to an electrical signal to be evaluated at blocking device 306 before transmission to the RF transceiver through antenna 304.

According to some implementations, the processing circuitry 308 receives the interrogating signal 310b and determines how to modify the surface acoustic wave interrogating signal 310b based on measurements from the sensing element 316. For instance, based on the measurements conducted by sensing element 316, processing circuitry 308 calculates how to modify the received surface acoustic wave interrogating wave 310a. Processing circuitry 308 may be coupled to a transducer, not pictured in FIG. 3, and reflectors 312 to modify the surface acoustic wave interrogating signal 310b into a response message 310b that is transmitted to the blocking device for eventual transmission to the RF transceiver through antenna 304.

In some implementations, the interfering sensors that do not match an interrogating signal produce low amplitude response messages. For example, if the interrogating message is received at the reflectors 312 of an RF sensor that is not the target sensor of that interrogating message, the resulting surface acoustic wave created by the phase shift reflectors 312 will create a very low amplitude distorted signal. The resulting response message to this low amplitude signal interrogating message will also be a low amplitude response message that can be filtered by the blocking device 306 and thereby prevented from reaching the antenna 304 to minimize interference.

In some embodiments, after the response message 310a has been converted to an electrical signal, the response message signal is transmitted to the blocking device 306. The blocking device may be, for example, a MOSFET, a BJT, or a diode as pictured in FIG. 3. The blocking device 306 may be configured to only turn on and conduct electricity if an input signal exceeds the turn on threshold voltage of the blocking device 306. Alternatively, the blocking device may be processing circuitry that can be programmed to only allow certain signals above a specified threshold value.

In some implementations, the blocking device 306 may be designed to have a threshold turn on voltage value that is higher than the amplitude of an individual unmatched interfering sensor's cross correlation response voltage value, and lower than an individual matched sensor's autocorrelation response voltage value. For example, combinations of inorganic and organic semiconductors can be used to design a blocking device with a customized threshold voltage turn on value to block the low amplitude response messages of interfering sensors, while allowing high amplitude response messages to continue to the antenna. For example, if RF sensor 300 is the target sensor for a received interrogating message, then the high amplitude signal will elicit a high amplitude signal response message from the sensing element 316 and processing circuitry 308. This high amplitude response when passed through blocking device 306 exceeds the threshold voltage of the blocking device 306 and is passed through to antenna 304 for transmission. Thus, only the target RF sensor antenna 304 will transmit a response back to the RF transceiver for a given interrogating message. Different antennae 304 on different RF sensors may simultaneously respond to the different interrogating signals transmitted by the RF transceiver in an RF sensor network. This allows for the various sensors in the RF network to report back their measurements without causing any interference from the other sensors in the network.

Example 4

Method of Mitigating Interference in an RF Network

Figure 4:
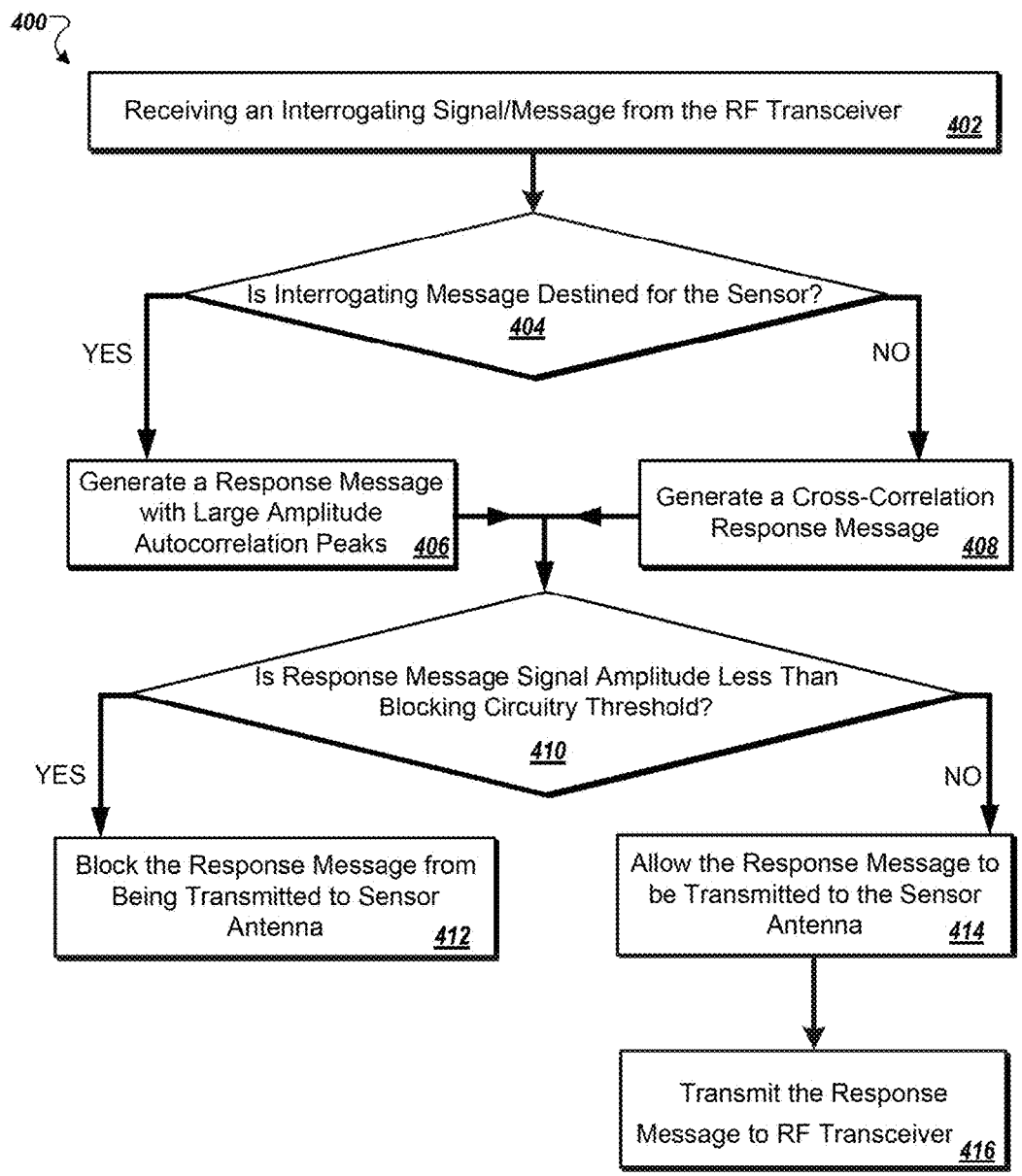
FIG. 4 shows a flow diagram of an exemplary method for mitigating interference in passive wireless sensors in accordance with several embodiments.

FIG. 4 illustrates a flow diagram of an exemplary method according to various embodiments for mitigating interference in passive wireless sensors and RFID tags. In some embodiments, the method 400, may be performed by an RF sensor, such as RF sensor device 304 described in relation to FIG. 3 or RF sensor 104 described in relation to FIG. 1.

In some embodiments, the method 400 includes a sensor receiving an interrogating message from an RFID transceiver (402). For example, an RF sensor device such as RF sensor 300 receives, through its antenna, an orthogonally coded interrogating message from an RFID sensor. The interrogating message may be converted to a surface acoustic wave upon impinging on phase shift reflectors on the RF sensor.

In some implementations, the sensor determines whether the interrogating message received from the RF transceiver is destined for the target sensor at which it is received (404). For example, if the sensor is the target sensor, the orthogonally coded interrogating message is matched by the sensor reflectors and is converted by the reflectors into a high amplitude surface acoustic wave that traverses the substrate of the sensor substrate. However, if the sensor is not the target sensor for the interrogating message, the orthogonally coded interrogating message is not matched by the reflectors and is converted by the reflectors into a distorted low amplitude surface acoustic wave that traverses the substrate of the sensor substrate.

In some embodiments, upon receiving an appropriate interrogating signal, the target sensor generates a response message with large amplitude autocorrelation peaks (406). For example, the arrangement of the reflectors on the target sensor device generates a high amplitude surface acoustic wave from the surface acoustic wave response to the impinging interrogating signal. Environmental factors that the sensor is designed to measure may affect the surface acoustic wave to phase shift the components of the surface acoustic waves to create a response message that carries the measurement recorded by the sensor. According to several implementations, processing circuitry in the sensor modifies the surface acoustic wave according to the measurements gathered at the sensing element to generate a high amplitude surface acoustic wave with high autocorrelation peaks and small cross-correlation side lobes. Such a response message may be converted to an electrical signal from surface acoustic waves by processing circuitry, a transducer, or phase shift reflectors and input into a blocking device such as blocking device 306 of FIG. 3.

In some embodiments, wherein the receiving sensor is a non-target sensor, the sensor generates a response message with low amplitude cross-correlation peaks (408). For example, the arrangement of the reflectors on the target sensor device generates a low amplitude surface acoustic wave from the incident interrogating surface acoustic wave since the orthogonally coded interrogating message is not well matched by the arrangement of reflectors on the sensor. In such embodiments, the phase shift reflectors, along with environmental factors, may distort the converted surface acoustic wave and generate a response message consisting of low amplitude cross correlation side lobes. In another implementation, processing circuitry in the sensor modifies the surface acoustic wave to generate a low amplitude surface acoustic wave with low amplitude cross-correlation side lobes. Such a response message may be converted to an electrical signal from surface acoustic waves by processing circuitry, a transducer, or phase shift reflectors and input into a blocking device such as blocking device 306 of FIG. 3.

According to numerous embodiments, the blocking device is configured to differentiate whether the generated response message signal amplitude is less than the blocking circuitry threshold turn on voltage (410). For example, the blocking device determines whether the amplitude of the response message is high enough to allow the blocking device to conduct electricity and pass the response message.

In some embodiments, the blocking device of the sensor blocks the response message from being transmitted to the sensor antenna upon determining that the response message signal amplitude is less than the threshold turn on voltage of the blocking device (412). For example, the blocking device does not allow response messages with low amplitude cross correlation side lobes to pass through to the sensor antenna because the amplitude of the voltage for those responses is below threshold. By blocking low amplitude responses, the blocking device prevents sensors that are not the target sensors from responding to the interrogating message and transmitting a noisy signal to the RF transceiver.

In some implementations, the blocking device of the sensor allows the response message to be transmitted to the sensor antenna upon determining that the response message signal amplitude is greater than or equal to the threshold turn on voltage of the blocking device (414). For example, the blocking device allows response messages with high amplitude autocorrelation peaks to pass through to the sensor antenna. By allowing such high amplitude response messages, the blocking device allows target sensors for an interrogating message to respond to the interrogating message and transmit a clear signal to the RF transceiver that is not masked by signals from non-target sensors.

According to some embodiments, the sensor antenna transmits the response message to the RFID transceiver (416). For example, the sensor antenna transmits the high autocorrelation peak response message to the RF transceiver. Only the target sensor antennae transmit a response message in response to the received interrogating message, thereby mitigating interference in large scale RF sensor networks. Since the noisy cross-correlation response message have been reduced or eliminated and may not be transmitted by sensors in the RF network, a very large number of sensors can be included in an RF network without the RF transceiver experiencing any interference issues.

Figure 5:
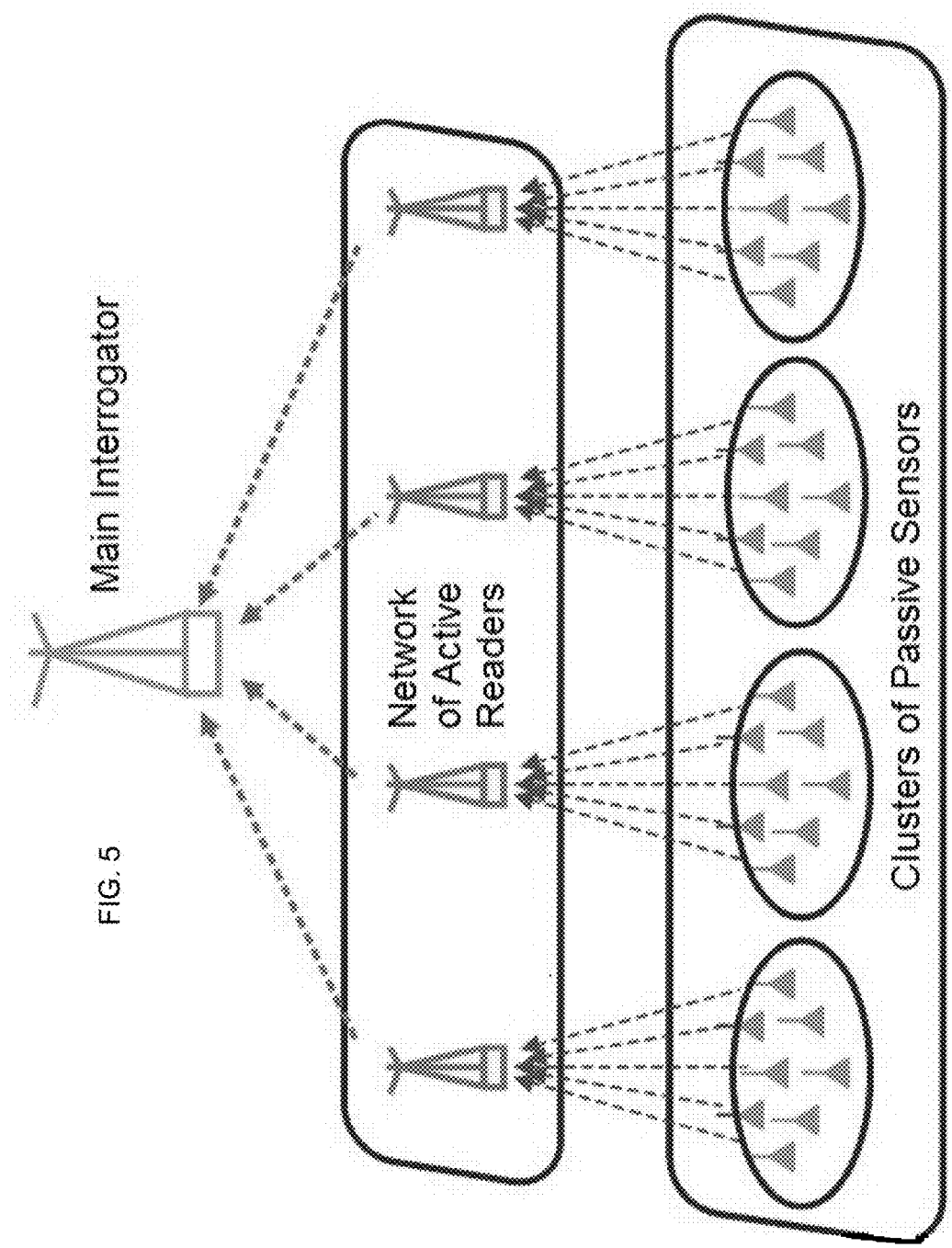
FIG. 5 shows a system level diagram of an exemplary wireless network in accordance with several embodiments.

Although described in relation to a particular series of steps, in some implementations, method 400 may include more or fewer steps. For example, in some embodiments, provided sensor networks will include more than one transceiver/interrogator and/or include one or more active readers in addition to the main interrogator, as shown in FIG. 5. In some implementations, one or more of the steps of the method 400 may be arranged in a different order. Other modifications of method 400 are possible without deviating from the concepts and scope of the method 400.

One of skill in the art will recognize variations of the specific embodiments disclosed herein. Exemplary variations may be found in the following references, which are hereby incorporated by reference to this patent application: A. Abedi and K Zyck, *Iterative Interference Management in Coded Passive Wireless Sensors*, IEEE Sensors 2013 Conference, November 2013. ; A. Abedi, *Signal detection in passive wireless sensor networks based on back-propagation neural networks*, 1 IET Wireless Sensor Systems, 48-54 (2010); E. Dudzik, A. Abedi, D. Hummels, and M. da Cunha, Wireless Multiple Access Surface Acoustic Wave Coded Sensor System, 44 IET Wireless Sensor Systems, 775-776 (2008); A. Abedi, Wireless Sensors without Batteries, High Frequency Electronics, 22-26 (2012); U.S. Pat. Nos. 8,348,504; 6,806,808; and 8,237,550.

The approach defined is the present invention is applicable to various types of sensors as long as the responses from different sensors are orthogonal in time, frequency and/or code domains.

In view of the structure, functions and apparatus of the systems and methods described here, in some implementations, a system and method for interference mitigation in passive wireless sensors are provided. Having described certain implementations of methods and apparatus for interference mitigation in passive wireless sensors is highly customizable to the needs of the network or availability of varied technologies. Therefore, the disclosure should not be limited to certain implementations, but rather should be limited only by the spirit and scope of the following claims.

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as the disclosed technology remains operable. Moreover, two or more steps or actions may be conducted simultaneously or sequentially, according to various embodiments.

What is claimed:

1. A set of sensors for use in an interrogation system with reduced or eliminated interference from non-target sensors, each sensor of the set of sensors comprising:
   an antenna configured to receive an interrogating signal and transmit a response signal detectable by a transceiver;
   a transducer with a unique embedded digital code; and
   a blocking device positioned between the antenna and the transducer, wherein the set of sensors, collectively, comprise digital codes embedded in the transducers, the embedded digital codes allowing for separation of the sensor response signals to a given interrogating signal by creation of an autocorrelation response at a target sensor that is differentiable from cross-correlation responses from non-target sensors, and wherein the blocking device of a given sensor in the set of sensors:
   (i) allows the interrogating signal to be received by the transducer of the given sensor;
   (ii) where a sensor is a target sensor, allows an autocorrelation response to the interrogating signal to be transmitted via the antenna of the given sensor; and
   (iii) where a sensor is a non-target sensor, blocks transmission of a cross-correlation response to the interrogating signal via the antenna of the given sensor.

2. The set of sensors of claim 1, wherein at least one of the sensors comprise a metal electrode photolithographically printed onto a piezoelectric substrate.

3. The set of sensors of claim 1, wherein at least one of the sensors is a passive wireless sensor.

4. The set of sensors of claim 1, wherein the set of sensors comprises at least 10, at least 20, at least 30, at least 50, at least 100, at least 200, at least 300, at least 400, or at least 500 sensors.

5. The set of sensors of claim 1, wherein the interrogating signal is an omnidirectional signal.

6. The set of sensors of claim 1, wherein the interrogating signal is a radio frequency signal.

7. The set of sensors of claim 1, wherein the response to the interrogating signal is an electrical or acoustic signal.

8. The set of sensors of claim 1, wherein the embedded code is a quasi-orthogonal digital code.

9. The set of sensors of claim 1, wherein, for each sensor, the blocking device positioned between the antenna and the transducer has an embedded threshold based at least in part on a ratio of peak to side lobe ratio (PSLR) of the autocorrelation response of the code for the sensor and maximum peak of the cross-correlation of the code for the sensor with the code of another sensor in the set, wherein an autocorrelation response exceeds the threshold and is allowed by the blocking device to pass via the antenna, while a cross-correlation response is below the threshold and is blocked.

10. The set of sensors of claim 1, wherein the blocking device is a transistor.

11. The set of sensors of claim 1, wherein the blocking device is a diode.

12. The set of sensors of claim 1, wherein the blocking device is configured to block transmission of a response having a preset voltage.

13. The set of sensors of claim 1, further comprising a wireless transceiver, wherein the transceiver is configured to transmit an interrogating signal to at least one sensor and is further configured to receive an autocorrelation response from a target sensor.

14. The set of sensors of claim 13, wherein the transceiver is stationary.

15. The set of sensors of claim 13, wherein the transceiver is configured to simultaneously transmit a plurality of different coded interrogating messages.

16. The set of passive sensors of claim 15, wherein each of the plurality of coded interrogating messages is targeted to a different sensor.

17. The set of sensors of claim 13, wherein the transceiver is configured to simultaneously receive and process responses from a plurality of sensors.

18. A sensor for use in an interrogation system with reduced or eliminated interference from non-target sensors, the sensor comprising:
- an antenna configured to receive an interrogating signal and transmit a response signal detectable by a transceiver;
- a transducer with an embedded code, wherein the embedded code allows for generation of a sensor response signal to a given interrogating signal wherein the sensor response signal is an autocorrelation response if the sensor is a target sensor and the sensor response signal is a cross-correlation response if the sensor if a non-target sensor; and
- a blocking device positioned between the antenna and the transducer, wherein the blocking device:
  (i) allows the interrogating signal to be received by the transducer;
  (ii) where the sensor is a target sensor, allows an autocorrelation response to the interrogating signal to be transmitted via the antenna of the given sensor; and
  (iii) where the sensor is a non-target sensor, blocks transmission of a cross-correlation response to the interrogating signal via the antenna.

19. The sensor of claim 18, further comprising a metal electrode photolithographically printed onto a piezoelectric substrate.

20. The sensor of claim 18, wherein the sensor is a passive wireless sensor.

21. The sensor of claim 18, wherein the interrogating signal is an omnidirectional signal.

22. The sensors of claim 18, wherein the interrogating signal is a radio frequency signal.

23. The sensor of claim 18, wherein the response to the interrogating signal is an electrical signal.

24. The sensor of claim 18, wherein the embedded code is a quasi-orthogonal digital code.

25. The sensor of claim 18, wherein the blocking device positioned between the antenna and the transducer has an embedded threshold based at least in part on a ratio of peak to side lobe ratio (PSLR) of the autocorrelation response of the code for the sensor and maximum peak of the cross-correlation of the code, wherein an autocorrelation response exceeds the threshold and is allowed by the blocking device to pass via the antenna, while a cross-correlation response is below the threshold and is blocked.

26. The sensor of claim 18, wherein the blocking device is a transistor.

27. The sensor of claim 18, wherein the blocking device is a diode.

28. The sensor of claim 18, wherein the blocking device is configured to block transmission of a response having a preset voltage.

29. The sensor of claim 18, further comprising a wireless transceiver, wherein the transceiver is configured to transmit the interrogating signal to at least one sensor and is further configured to receive the autocorrelation response from a target sensor.

30. The sensor of claim 29, wherein the transceiver is stationary.

31. A method of reducing or eliminating interference from non-target sensors in a wireless sensor network; the method comprising:
- receiving an interrogating signal at an antenna of a sensor;
- comparing a code in the interrogating signal with a code embedded on the sensor;
- determining if the sensor is a target sensor or a non-target sensor, wherein if the code in the signal matches the code on the sensor, the sensor is a target sensor, and wherein if the code in the signal does not match the code on the sensor, the sensor is a non-target sensor;
- generating an autocorrelation response if the sensor is the target sensor, or
- generating a cross-correlation response if the sensor is the non-target sensor;
- allowing the autocorrelation response to be transmitted to the antenna;
- blocking the cross-correlation response from being transmitted to the antenna; and
- transmitting the autocorrelation response signal from the antenna.

32. The method of claim 31, wherein the interrogating signal is an omnidirectional signal.

33. The method of claim 31, wherein the interrogating signal is a radio frequency signal.

34. The method of claim 31, wherein the receiving is from a wireless transceiver.

35. The method of claim 31, wherein the cross-correlation response is blocked from being transmitted to the antenna by a transistor.

36. The sensor, wherein the cross-correlation response is blocked from being transmitted to the antenna by a diode.

* * * * *